(12) United States Patent
Yagi et al.

(10) Patent No.: US 8,676,005 B2
(45) Date of Patent: Mar. 18, 2014

(54) LIGHT GUIDE FOR LIGHT SOURCE DEVICE AND METHOD FOR MANUFACTURING THE SAME

(75) Inventors: Kenji Yagi, Yokohama (JP); Tadashi Suga, Tokyo (JP); Masafumi Kitamura, Otake (JP); Satoshi Miyadera, Yokohama (JP); Takeo Ookura, Yokohama (JP); Tetsuya Suda, Yokohama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 111 days.

(21) Appl. No.: 13/141,553

(22) PCT Filed: Dec. 25, 2009

(86) PCT No.: PCT/JP2009/007312
§ 371 (c)(1),
(2), (4) Date: Jun. 22, 2011

(87) PCT Pub. No.: WO2010/073726
PCT Pub. Date: Jul. 1, 2010

(65) Prior Publication Data
US 2011/0255835 A1    Oct. 20, 2011

(30) Foreign Application Priority Data

Dec. 25, 2008  (JP) .................. 2008-329810
Dec. 26, 2008  (JP) .................. 2008-334364
Jul. 3, 2009   (JP) .................. 2009-159017

(51) Int. Cl.
G02B 6/26  (2006.01)
(52) U.S. Cl.
USPC ............................................ 385/31
(58) Field of Classification Search
None
See application file for complete search history.

(56) References Cited

U.S. PATENT DOCUMENTS

| | | | |
|---|---|---|---|
| 5,857,761 A | 1/1999 | Abe et al. | |
| 2006/0024017 A1 | 2/2006 | Page et al. | |
| 2007/0057031 A1 | 3/2007 | Lee | |
| 2007/0248307 A1* | 10/2007 | Page et al. | 385/123 |
| 2008/0130264 A1* | 6/2008 | Page et al. | 362/26 |

FOREIGN PATENT DOCUMENTS

| | | |
|---|---|---|
| CN | 2735384 Y | 10/2005 |
| JP | 59-25584 U | 2/1984 |
| JP | 61-201001 U | 12/1986 |
| JP | 7-245676 | 9/1995 |

(Continued)

OTHER PUBLICATIONS

International Search Report from PCT/JP2009/007312 (PCT corresponding to present application).

(Continued)

Primary Examiner — Jerry Rahll
(74) Attorney, Agent, or Firm — Morgan, Lewis & Bockius LLP

(57) ABSTRACT

A light guide for a light source device includes a core layer which is formed from a transparent resin and has a refractive index $n_1$ and cladding layers which are provided on both surfaces thereof and have a refractive index $n_2$ which is lower than the refractive index $n_1$ of the core layer. A light reflecting layer which scatters and reflects light is provided in the front surface of one cladding layer, the front surface of the other cladding layer is set as a light emitting face, and a recess is provided which reaches from at least one of either of the front surface of the one cladding layer or the front surface of the other cladding layer to the core layer passing through the cladding layer.

11 Claims, 9 Drawing Sheets

(56) References Cited

FOREIGN PATENT DOCUMENTS

| | | |
|---|---|---|
| JP | 9-325221 | 12/1997 |
| JP | 2001-167624 | 6/2001 |
| JP | 2005-032703 | 2/2005 |
| JP | 2007-080824 | 3/2007 |
| JP | 2008-508556 | 3/2008 |
| TW | 1283777 B | 7/2007 |

OTHER PUBLICATIONS

Sipo—First Office Action for Chinese Patent Application No. 200980152702.9—Issued on Mar. 4, 2013—Including English Translation.

Tipo—First Office Action for Taiwanese Patent Application No. 098145013—Issued on Jul. 8, 2013. Including English Translation.

* cited by examiner

LIGHT GUIDE FOR LIGHT SOURCE DEVICE AND METHOD FOR MANUFACTURING THE SAME

TECHNICAL FIELD

The invention relates to a light guide for a light source device and a method for manufacturing the same.

Priority is claimed on Japanese Patent Application No. 2008-329810, filed Dec. 25, 2008, Japanese Patent Application No. 2008-334354, filed Dec. 26, 2008, and Japanese Patent Application No. 2009-159017, filed Jul. 3, 2009, the content of which is incorporated herein by reference.

BACKGROUND ART

In the past, as a light source device used in a liquid crystal display device used in a mobile phone, a laptop computer, a liquid crystal television, a video camera, or the like, and a display device such as the backlit keys of a mobile phone, a backlit keyboard for a computer, a display switch of an electrical appliance, there is a direct type where a plurality of linear light sources such as fluorescent lights, or a plurality of point light sources, such as light emitting diodes, are individually arranged in a housing, and an edge light type where a linear light source or a point light source is arranged at a side surface of a light guide with a plate shape.

The light source device with the edge light type typically has a transparent member such as an acrylic resin plate with a rectangular plate shape as a light guide, light from a light source which is disposed to face a side surface is incident on the light guide from a side edge surface (a light incidence face), and by providing an emission mechanism formed on the front surface (a light emitting face) or the rear surface of the light guide or a light emitting means such as where light diffusion particles are included in the light guide, the incident light is emitted from the light emitting face. In a light guide such as this, the light which is incident from the side edge surface may lead to a reduction in the amount of light due to emission from not just the light emitting face but also the rear surface. As a result, in the light source device, a reflective sheet is arranged on an opposite side to the light emitting face of the light guide, and the emitted light is reused by being reflected from the rear surface and returned into the light guiding member. In this manner, it is possible to obtain a light source device which has superior luminance by the light from the light source being used with high efficiency.

In addition, in the typical light source device with the edge light type, since the light which is emitted from the light emitting face is emitted in a direction where the light guiding direction is horizontal with regard to the light emitting face, there is deviation in the peak of the emitted light with regard to the direction which is actually used in an electrical appliance and the use efficiency of the light is poor. As a result, in a case of being used in a display device, the emission direction is adjusted towards the front surface by finely controlling the shape of the emitting mechanism or also using an optical sheet such as a prism sheet or a diffusion sheet.

In recent years, thinner types of liquid crystal display devices, which are used in devices which are often carried around, such as portable laptop computers or mobile phones, have been in demand. Along with the demand for thinner types of liquid crystal display devices, thinner types of light source devices are also in demand. The effect of the light guide on the thickness of the light source device is high, and it can be said that making thinner types of light guide is the key to making thinner types of liquid crystal display devices and light source devices. On the other hand, the light guide has a purpose where uniform surface light emission in the light source device is an aim as well as a purpose of supplying and emitting light to a particular position. In terms of both purposes, the prevention of the loss of light which is incident in the light guide and the light source device emitting light with high luminance are demanded in the light guide. For example, there is proposed a light guide (for example, Patent Literature 1) for a backlight of a key pad which is thin while being able to supply light to a particular position and emit light with high efficiency using a single layer of a polycarbonate sheet being the light guide and through being formed in a pattern with a convex shape by the front surface of the polycarbonate sheet being processed by hot stamping, injection molding, micro blasting, or the like, and a light guide (for example, Patent Literature 2) for a backlight for a keyboard which emits light by a dot pattern being provided on the front surface of a surface which faces the light emitting face and light which is guided in the light guide being reflected or scattered to the light emitting face side.

There is proposed a light guide (for example, Patent Literature 3) where light is emitted by a flat optical fiber which is provided with a core layer and a cladding layer with a refractive index lower than the core layer being the light guide, the light being efficiently confined in the light guide using the total reflection of the core-cladding interface, and forming a discontinuous portion in the cladding layer on the light emitting face in a position where light is to be emitted. The light guide which has a core-cladding configuration suppresses light leaking from the light guide, and use efficiency of the light which is incident from the light incidence face is achieved.

PATENT LITERATURE

[PTL 1] JP-A-2007-80824
[PTL 2] JP-A-2005-32703
[PTL 3] JP-T-2008-508556

SUMMARY OF INVENTION

Technical Problem

However, in the light guide used in the light source device, further improvement in luminance is being demanded. In the case where a single layer of resin is used as the light guide for a light source device as described above, the light to be emitted from the light emitting face using a light emitting means is normally also emitted from the opposite surface to the light emitting face. In addition, in a portion where dust or dirt is attached to the front surface of the single layer of resin, it is easy for light which is incident and propagated in the single layer of resin to leak. As a result, the light from the light guide leaks and the amount of light is reduced, and there is a concern that the luminance of the light source device, and in particular, the luminance at a position which is far from the light incidence face of the light guide is reduced.

As a means for resolving the leakage of light, there is a method where a reflective sheet is arranged on the surface which faces the light emitting face of the light guide, but in the case where the reflective sheet is arranged, it is necessary to arrange the reflective sheet with a gap using an air layer since there is scattering and absorption of light which is propagated in the light guide at a portion where the reflective sheet is optically adhered to the front surface of the light guide and this may lead to a reduction in luminance. In order to arrange the reflective sheet with a gap, since a complex operation is required such as matching the position while maintaining clearance between the light guide and the reflective sheet, there is a problem of not only the cost of the reflective sheet itself but also the cost of the assembly operation increasing.

In addition, efficient illumination of the display device such as a keyboard or switch of the electrical appliance and further increasing of the luminance of the light emitting face is being demanded in the light guide. In the increasing of the luminance of the light emitting face, there is a method where the peak of the emitted light intensity is matched with the vertical direction (normal direction) of the light emitting face, but in the light guide in the related art, while it is possible to emit light at an arbitrary position on the light emitting face, it is difficult to control the emission direction of the emitted light. For example, as in the invention of the Patent Literature 3, when light is emitted by a discontinuous portion being provided in the cladding layer, the emission direction of the light which is emitted from the discontinuous portion is controlled by the side wall shape of the discontinuous portion. As a result, in the controlling of the emission direction of the emitted light, it is necessary to finely control the shape of the discontinuous portion. In the finely controlling of the emission direction of the emitted light, there are problems in that processing of the discontinuous portion is extremely complex, productivity is poor, and costs become high.

In addition, in a case where control of the emission direction is performed using an optical sheet such as a prism sheet or a diffusion sheet, increasing of the number of parts, poor productivity, and increasing of costs may result.

Therefore, in the invention, it is desirable that there is a light guide for a light source device and a method for manufacturing the same which control the emission direction of emitted light and achieve an improvement in luminance of the light emitting face productively and cheaply using a simple method.

Solution to Problem

In an aspect of the invention, a light guide for a light source device having: a core layer which is formed from a transparent resin and has a refractive index $n_1$; and cladding layers which are provided on both surfaces thereof and have a refractive index $n_2$ which is lower than the refractive index $n_1$ of the core layer; wherein a light reflecting layer which scatters and reflects light is provided in the front surface of one cladding layer, the front surface of the other cladding layer is set as a light emitting face, and a recess is provided which reaches from at least one of either of the front surface of the one cladding layer or the front surface of the other cladding layer to the core layer passing through the cladding layer, wherein at least one of the side edge surfaces of the light guide for a light source device, which is substantially perpendicular to a surface where the light emitting face and the light reflecting layer are provided, is set as a light incidence face, and the recess is provided in the light emitting face and the inclination angle θ of the light incidence face side of the recess satisfies equation 1 below.

$$\theta \leq 90 + \cos^{-1}(n_2/n_1) - \sin^{-1}(1/n_1) \qquad \text{equation 1}$$

In addition, the light guide for a light source device according to an aspect of the invention is the light guide for a light source device of (2) where the light reflecting layer is provided in a position where light reflected by the recess is reflected.

In addition, the light guide for a light source device according to the aspect of the invention, wherein the light reflecting layer is provided so as to cover the entire front surface of one of the cladding layers.

In addition, the light guide for a light source device according to the aspect of the invention, wherein the depth of the recess increases in accordance with separation from the light incidence face.

In addition, the light guide for a light source device according to the aspect of the invention, wherein the distance between adjacent recesses decreases in accordance with separation from the light incidence face.

In addition, in the light guide for a light source device according to an aspect of the invention, a light guide for a light source device having: a core layer which is formed from a transparent resin and has a refractive index $n_1$; and cladding layers which are provided on both surfaces thereof and have a refractive index $n_2$ which is lower than the refractive index $n_1$ of the core layer; wherein a light reflecting layer which scatters and reflects light is provided in the front surface of one cladding layer, the front surface of the other cladding layer is set as a light emitting face, and a recess is provided which reaches from at least one of either of the front surface of the one cladding layer or the front surface of the other cladding layer to the core layer passing through the cladding layer, wherein at least one of the side edge surfaces, which is substantially perpendicular to the surface where the light emitting face and the light reflecting layer are provided, is set as the light incidence face, a recess is provided in a surface where the light reflecting layer is provided, and a second light reflecting layer is provided in an inner portion of the recess.

In addition, in the light guide for a light source device according to an aspect of the invention, the light reflecting layer is provided so as to cover the entire front surface of one of the cladding layers.

In addition, in the light guide for a light source device according to an aspect of the invention, the light reflecting layer is a coating layer with a white color.

In addition, in the light guide for a light source device according to an aspect of the invention, the depth of the recess increases in accordance with separation from the light incidence face.

In addition, in the light guide for a light source device according to an aspect of the invention, the distance between adjacent recesses decreases in accordance with separation from the light incidence face.

Advantageous Effects of Invention

According to the light guide of the invention, it is possible to integrate the light guide and the reflective sheet without reducing the light guiding function, and an improvement in the luminance of the light source device and simplification of the assembly operation of the light source device can be achieved. In addition, it is possible to control the emission direction of the emitted light and improve luminance of the light emitting face productively and cheaply using a simple method.

DESCRIPTION OF EMBODIMENTS

The invention will be described with the embodiments below, but the invention is not limited to the embodiments below.

First Embodiment

Figure 1:
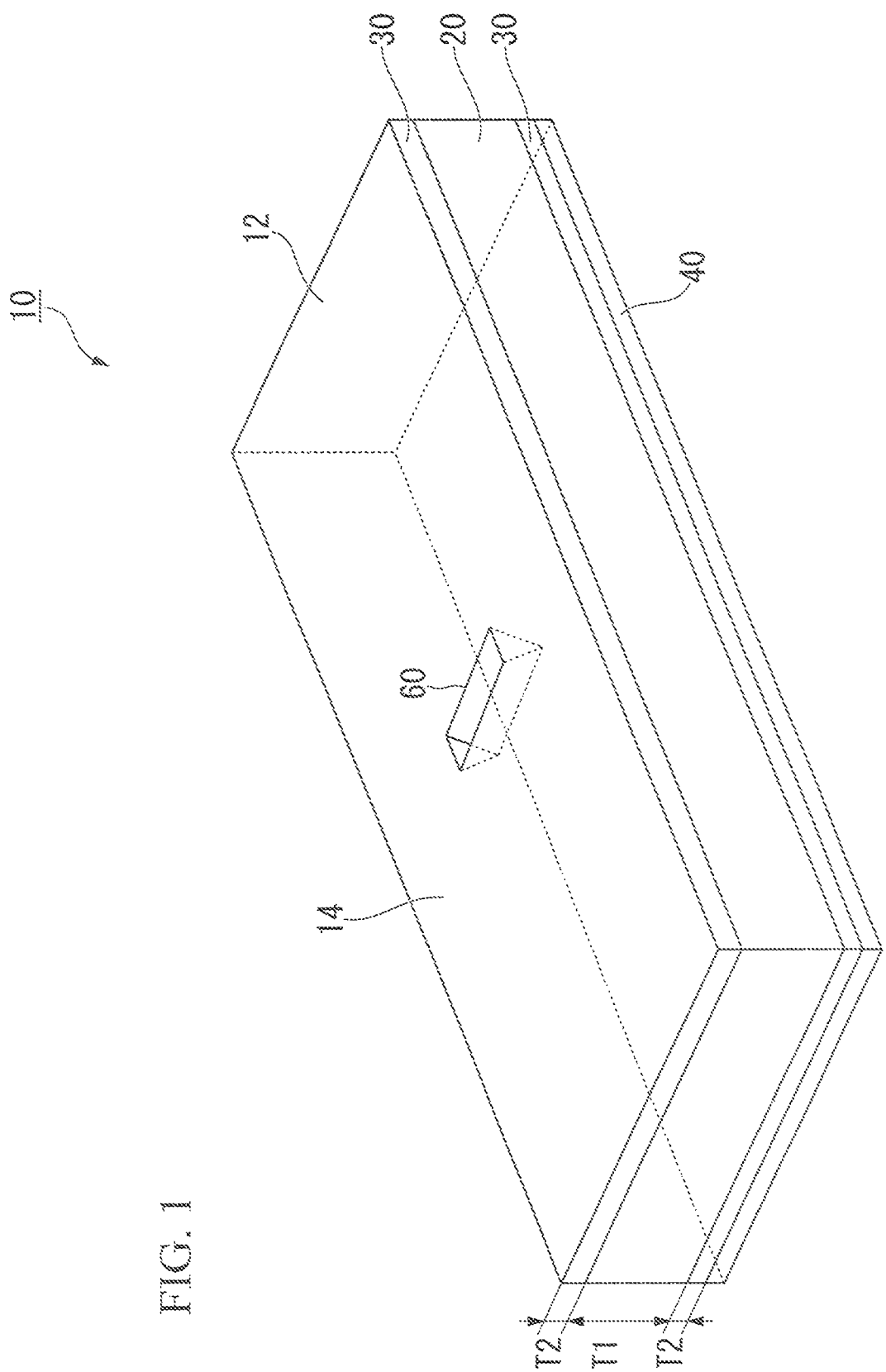
FIG. 1 is a perspective diagram illustrating a light guide for a light source device according to a first embodiment of the invention.

A light guide for a light source device according to a first embodiment of the invention will be described using FIG. 1. FIG. 1 is a perspective diagram of a light guide 10 for a light source device according to the first embodiment. As shown in FIG. 1, the light guide 10 for a light source device has a core layer 20 and cladding layers 30 which are provided on both surfaces of an upper surface and a lower surface which are the main surfaces of the core layer 20, and a light reflection layer 40 is provided in the front surface of one cladding layer 30, the front surface of the other cladding layer 30 is set as a light emitting face 14, and a recess is provided in the light emitting face as a light emitting means. Then, one side surface of the light guide 10 for a light source device is set as a light incidence face 12. Here, the shape of the light guide 10 for a light source device is not particularly limited as long as it is a plate shape and may be a multi-angular shape, such as a rectangle or a triangle, a circular shape, such as a circle or an oval, or the like. In addition, the shape of the light guide 10 for a light source device may be a curved shape.

Core Layer

The core layer 20 is a transparent light-transmitting layer. As a material which forms the core layer 20, it is possible to use known materials, and for example, it is possible to be configured with polymethylmethacrylate (PMMA) or a copolymer of methyl methacrylate as the main component. Among these, a configuration where PMMA is the main component is preferable since it is superior in terms of transparency and durability as well as being cheap. Here, in a case where a copolymer of methyl methacrylate is used, it is preferable that the amount of methyl methacrylate is equal to or more than 50% by mass. As a monomer where copolymerization is possible, for example, there are acrylic esters such as methyl acrylate, ethyl acrylate, n-butyl acrylate, methacrylic esters such as ethyl methacrylate, propyl methacrylate, cyclohexylmethacrylate, maleimides, acrylic acid, methacrylic acid, maleic anhydride, and styrene.

In addition, from the point of view of superior heat resistance, it is possible to appropriately use polycarbonate resin, alicyclic polyolefin resin, or the like. In particular, since the bending ratio of polycarbonate resin is higher than PMMA, numerical aperture increases. As a result, when the light guide 10 for a light source device is bended, it is possible to suppress the leakage of light to be low. Here, numerical aperture is an "ability to collect light", it is possible to increase the amount of received light as the numerical aperture becomes larger, and it is possible to suppress the leakage of light when the light guide 10 for a light source device is bended.

A thickness T1 of the core layer 20 is not particularly limited, but from the point of view of achieving the making of thinner types of liquid crystal display devices and light source devices, it is preferably set to a range of 0.1 mm to 6 mm.

Cladding Layer

The cladding layer 30 is a transparent light-transmitting layer and has a refractive index which is lower than the refractive index of the core layer 20. It is possible to determine material which forms the cladding layer 30 in consideration of the refractive index of the core layer 20. As the material of the cladding layer 30, for example, there is a resin composition with fluorine-containing olefin resin as the main component. As the fluorine-containing olefin resin, for example, there can be vinylidene fluoride homopolymers and vinylidene fluoride copolymers, such as a binary copolymer of vinylidene fluoride and tetrafluoroethylene, a binary copolymer of vinylidene fluoride and hexafluoropropylene, a binary copolymer of vinylidene fluoride and trifluoroethylene, or a ternary copolymer of vinylidene fluoride, tetrafluoroethylene, and hexafluoropropylene.

A refractive index difference of the refractive index $n_1$ of the core layer 20 and the refractive index $n_2$ of the cladding layer 30 is expressed by equation (α) below, is more than zero, and preferably is equal to or more than 0.01. This is because, if the refractive index difference is more than zero, the incident light is totally reflected in the light guide 10 for a light source device while being propagated far without loss and it is easy to obtain emitted light with high luminance without the leakage of light occurring even if the light reflecting layer is optically adhered to the front surface of a light guide plate.

$$\text{Refractive index difference} = n_1 - n_2 \quad (\alpha)$$

A thickness T2 of the cladding layer 30 is not particularly limited, but it is preferable that it is set in the range of 3 to 500 μm from the point of view of the ease of handling the light guide 10 for a light source device and the efficiency in confining light. This is because, if the thickness T2 is in this range, the light guide 10 for a light source device has flexibility and excellent ease of handling as well as it being possible to efficiently confine the light in the light guide for a light source device.

The ratio of the thickness T1 of the core layer 20 and the thickness T2 of the cladding layer 30 is able to be determined in consideration of the material of the core layer 20 and the cladding layer 30. In addition, the material of the cladding layer on the light emitting face side is the same as the material of the cladding layer on the rear surface side. The same material of the cladding layer on the light emitting face side and the cladding layer on the rear surface side may be used or the material may be different.

Light Emitting Means

As a light emitting means, it is sufficient if the light propagated in the core layer 20 is emitted from the light emitting face 14, and for example, a recess which passes through the cladding layer 30 and reaches the core layer 20 is preferable due to the ease of control of the emission position of the light.

The recess is provided in the light emitting face 14 of the cladding layer 30. The recess is a so-called "incision" such as a through hole or groove-shaped crack which perforates the cladding layer 30 and reaches the core layer 20. By providing the recess, the light, which is incident in the core layer 20 from the light incidence face 12, is reflected by the recess, reaches the light reflection layer 40 provided at a position which faces the recess, is emitted from the light emitting face 14 due to being scattered and reflected, and the light guide 10 for a light source device is able to emit light. Here, in order for the light propagated in the core layer 20 to be reflected by the recess, it is necessary that at least a portion of the recess, which passes through the cladding layer 30 and reaches the core layer 20, reaches an inner portion of the core layer 20. That is, it is necessary that the depth of the recess is appropriately set so that the thickness of the recess is larger than the thickness of the cladding layer 30. The shape of the recess provided in the cladding layer 30 is not particularly limited if at least a portion of the recess reaches the core layer 20 and the inclination angle θ of the light incidence face side of the recess satisfies equation 1 described below, and is able to be determined in consideration of the amount of light of the light source, the distance from the light incidence face 12 to the opposite side, the form of emitted light required in the light guide 10 for a light source device, and the like.

For example, as the shape of the light emitting means, there is a conical shape, a chipped-spherical shape, a line shape, or the like. In addition, among the shapes, one type may be used by itself or two or more types may be combined and used. Additionally, in a case where the shape of the light emitting means is a line shape, the extending direction of the line may be parallel, may intersect in a perpendicular manner, or may intersect in an inclined manner at an arbitrary angle, with regard to a light guiding direction of the light incident from the light incidence face 12. In addition, for example, a plurality of circular lines may be arranged in a concentric manner.

Light Reflecting Layer

The light reflecting layer 40 is not particularly limited if it is able to scatter and reflect the light which leaks from the cladding layer 30 to the light emitting face 14 side, but, for example, there is a coating layer where a coating which reflects visible light is carried out and formed. As the coating layer which reflects visible light, for example, there is a coating layer of vinyl, polyester, acryl, urethane, or epoxy ink, an ink where the inks have metallic particles such as aluminum incorporated therein, or the like. It is preferable if the coating layer which reflects visible light is a coating layer with a white color with high reflectivity with regard to the entire range of visible light. In addition, it is preferable that a coating material with high scattering efficiency is used since it is possible to adjust the peak direction of the emitted light. In addition, in order to improve the adhesion properties of the ink to the cladding layer 30, modification of the cladding layer 30 may be carried out using a corona discharge process, a plasma discharge process, or the like.

In addition, for example, as the light reflecting layer 40, it is possible to use a metal deposition layer which is formed using metal deposition, a metallic film formed using the adhesion of a thin metal film, or the like. The metal deposition layer is formed from at least one of the metals selected from the group formed of aluminum, nickel, gold, platinum, chromium, iron, copper, iridium, tin, silver, titanium, lead, zinc, or the like, an alloy of these metals, or a compound of these metals. As a formation method of the metal deposition layer, there is a vacuum deposition method, a sputtering method, an ion plating method, a plating method, or the like.

Next, the arrangement of the light emitting means and the light reflecting layer and the operation thereof will be described using FIGS. 3 and 4.

Figure 3:
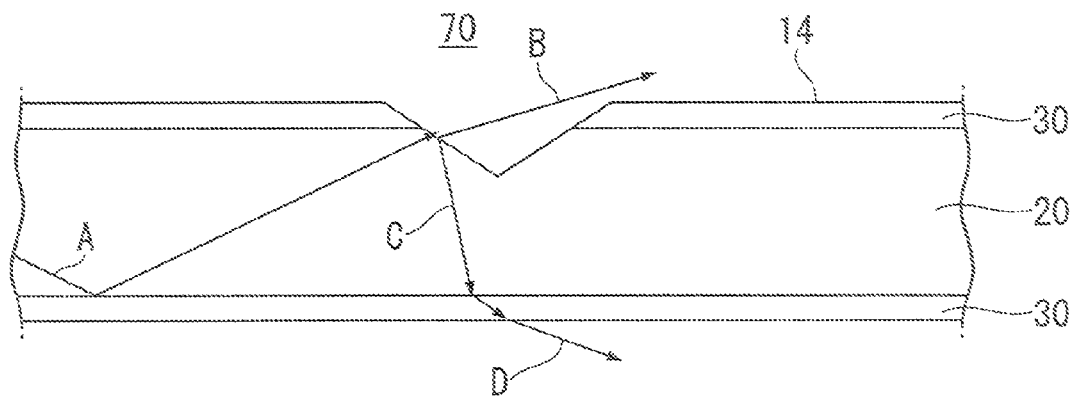
FIG. 3 is a pattern diagram describing a propagation state of light in a light guide for a light source device.

In the light guide for a light source device in FIG. 3, a recess 70, which is a hole which passes through the cladding layer 30 and reaches the core layer 20, is provided in the light emitting face 14. As shown in FIG. 3, light A, which is incident in the core layer 20 from the light incidence face, is totally reflected at the interface of the core layer 20 and the cladding layer 30, and propagated, is refracted when having reached the recess 70 and a portion thereof is emitted to the light emitting face 14 side as emitted light B. On the other hand, the other portion of the light A which has reached the recess 70 is reflected at an opposite side to the light emitting face 14 as light C. At this time, since the light reflecting layer is not provided on the opposite side to the light emitting face 14, the light C passes through the cladding layer 30 and leaks as light D.

Figure 4:
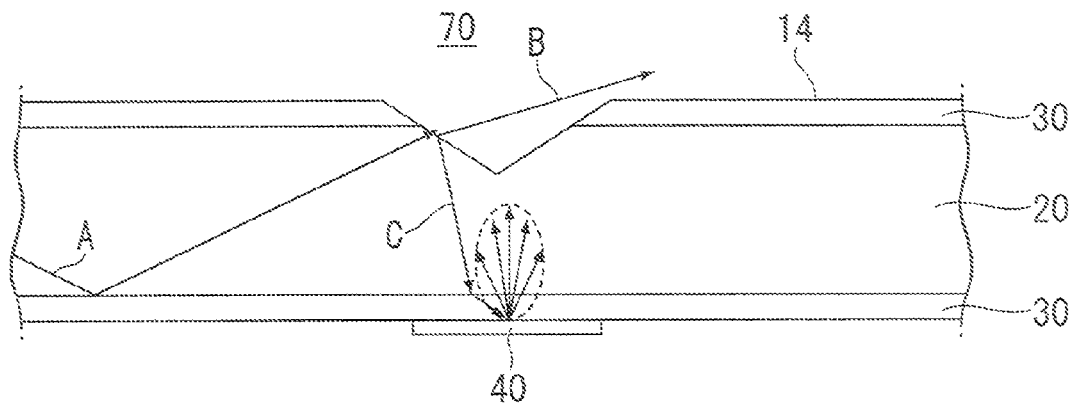
FIG. 4 is a pattern diagram describing a propagation state of light in a light guide for a light source device.

Here, as shown in FIG. 4, the light reflecting layer 40 is provided on a portion of the front surface of the cladding layer 30 in the side opposite to the light emitting face 14 in accordance with the angle of the light C which is reflecting by the recess 70 toward the opposite side to the light emitting face 14, and it is possible to prevent loss due to the leakage of light such as the light D by a portion of the light C being emitted from the light emitting face 14 due to scattering and reflection and the remainder of the light C being returned to the core layer 20.

Here, in the case where the light reflecting layer 40 is provided on a portion of the opposite side to the light emitting face 14 as shown in FIG. 4, the size and position of the light reflecting layer 40 is able to be determined in consideration of the shape of the recess 70, the material of the core layer 20, and the material of the cladding layer 30. That is, by the light reflecting layer 40 with the required size being provided in the required position in consideration of the reflection angle of the light C, it is possible to achieve a reduction in the leakage of light and attain emitted light with high luminance.

Next, the inclination angle θ of the light incidence face side of the recess will be described with reference to FIG. 5.

When the refraction index of the core layer is set to $n_1$ and the refraction index of the cladding layers, which are provided on both sides thereof and have a refractive index lower than the refractive index $n_1$ of the core layer, is set to $n_2$ in the light guide for a light source device of the invention, at least one of the side edge surfaces, which is substantially perpendicular to the surface where the light emitting face and the light reflecting layer are provided, is set as the light incidence face, and in a case where the recess is provided in the light emitting face, it is preferable if the inclination angle θ of the light incidence face side of the recess satisfies equation (1) below.

$$\theta \leq 90 + \cos^{-1}(n_2/n_1) - \sin^{-1}(1/n_1) \qquad \text{equation (1)}$$

The reason is that when the refraction index of the core layer=$n_1$ and the refraction index of the cladding layers=$n_2$, only the components of the angle range expressed in equation (A) below are the transmission mode and are propagated due to total reflection in the optical sheet.

$$-\cos^{-1}(n_2/n_1) \leq \alpha \leq \cos^{-1}(n_2/n_1) \qquad \text{(A)}$$

Light incidence angle β, when the light of the transmission mode reaches the recess which has the light incidence face with the inclination angle θ, is expressed by equation (B) below.

$$\beta = 90 - \theta + \alpha \quad (B)$$

On the other hand, the critical angle at the core-air interface surface is shown by equation (C).

$$\text{Critical angle} = \sin^{-1}(1/n_1) \quad (C)$$

Accordingly, a condition for the light of the transmission mode which is propagated at an angle α to be totally reflected at the light incidence face is that equation (D) below is satisfied.

$$\beta \geq \sin^{-1}(1/n_1) \quad (D)$$

If equation (D) is inserted into equations (A) and (B), this gives $$\theta \leq 90 \pm \cos^{-1}(n_2/n_1) - \sin^{-1}(1/n_1)$$

and there is total reflection under this condition.

For example, since in a case where the core layer is polymethylmethacrylate (PMMA), $n_1 = 1.49$, and in a case where the cladding layer is polyvinylidene fluoride (PVDF), $n_2 = 1.42$, equation 1 above becomes $$\theta \leq 90 \pm \cos^{-1}(1.42/1.49) - \sin^{-1}(1/1.49)$$

$$\Leftrightarrow \theta \leq 90 \pm 17.63 - 42.16$$

$$\therefore \theta \leq 65.47 \text{ or } 30.21$$

and the upper limit value of θ is 65.47 degrees.

The size of the light emitting means is able to be determined in the range which does not pass through the light guide 10 for a light source device in consideration of the material of the light guide 10 for a light source device and the material of the light reflecting layer. That is, in the relationship with a thickness T of a light guide 220 for a light source device, a distance D1 until the deepest portion of a rear-surface-side light scattering section 230 with regard to a rear surface 214 shown in FIG. 6 satisfies the relationship of D1<T. By the light emitting means having such a size, it is possible for the light propagated in the light guide 220 for a light source device to be sufficiently scattered and reflected.

Figure 6:
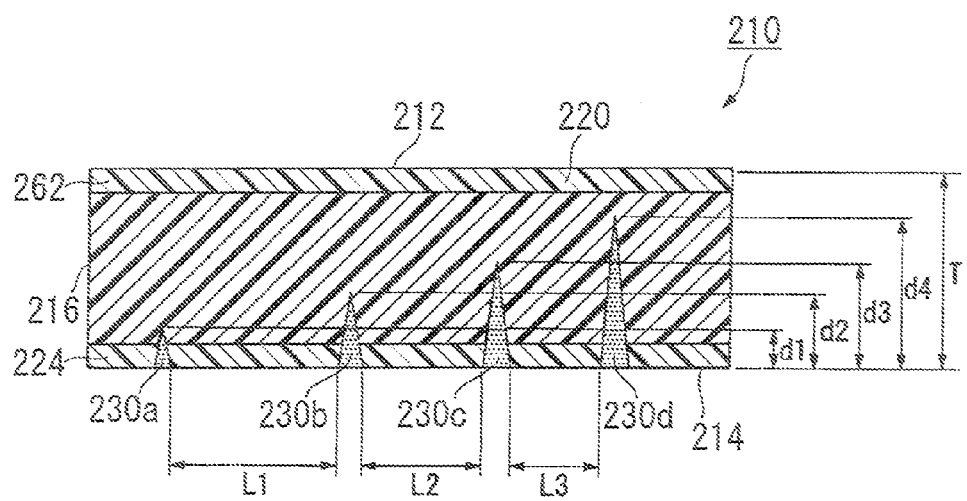
FIG. 6 is a cross-sectional diagram describing an arrangement pattern of a rear-surface-side light scattering section of the light guide according to the first embodiment of the invention.

In a case where two or more of the light emitting means are provided, the distances D1 until the deepest portion of the light emitting means with regard to the rear surface 214 may each be different. For example, in order for uniform luminance to be obtained irrespective of the length of the distance from a light incidence face 216, it is preferable to provide the rear-surface-side light scattering section 230 so that the deepest portion of the rear-surface-side light scattering section 230 with regard to the rear surface 214 is made to be deeper in accordance with being separated from the light incidence face 216. Here, in making the deepest portion of the rear-surface-side light scattering section 230 deeper in accordance with being separated from the light incidence face 216, there is an arrangement as shown in FIG. 6 where the distances d1 to d4 from the rear surface 214 until the deepest portions of the rear-surface-side light scattering sections 230a to 230d are set so that d1<d2<d3<d4. In addition, for example, there is an arrangement where an arbitrary number of the rear-surface-side light scattering sections are set as one unit and the distance from the rear surface 214 until the deepest portion for each one unit is made to be longer in accordance with being separated from the light incidence face 216.

A width W1 of the rear-surface-side light scattering section 230 is able to be determined in consideration of the material of a second light reflecting layer, the number, the range and position of light emission, and the like of the rear-surface-side light scattering sections 230. In a case where two or more of the rear-surface-side light scattering sections 230 are provided, the widths W1 of the rear-surface-side light scattering sections 230 may each be different. Here, the width W1 may express the maximum width of the rear-surface-side light scattering section 230.

In a case where two or more of the rear-surface-side light scattering sections 230 are provided, the distances with other adjacent rear-surface-side light scattering sections 230 are able to be determined in consideration of the size, shape, and position and range of the emitted light of the rear-surface-side light scattering sections 230. For example, in order for uniform luminance to be obtained irrespective of the length of the distance from the light incidence face 216, it is preferable to provide the rear-surface-side light scattering section 230 so that the distance between the rear-surface-side light scattering section 230 and another rear-surface-side light scattering section which is adjacent to the rear-surface-side light scattering section 230 is made to be shorter in accordance with being separated from the light incidence face 216. Here, in making the distance between the rear-surface-side light scattering section 230 and another rear-surface-side light scattering section which is adjacent to the rear-surface-side light scattering section 230 shorter in accordance with being separated from the light incidence face 216, for example, there is an arrangement as shown in FIG. 6 where a distance L1 between the rear-surface-side light scattering section 230a and the rear-surface-side light scattering section 230b, a distance L2 between the rear-surface-side light scattering section 230b and the rear-surface-side light scattering section 230c, and a distance L3 between the rear-surface-side light scattering section 230c and the rear-surface-side light scattering section 230d are set so that L3<L2<L1. In addition, for example, there is an arrangement where an arbitrary number of light scattering sections are set as one unit and the distance with other adjacent units is made to be shorter in accordance with each unit being separated from the light incidence face 216.

Manufacturing Method

It is possible to manufacture the light guide 10 for a light source device by laminating the cladding layers 30 on both surfaces of the core layer 20 and providing the light reflecting layer 40 on the front surface of one of the cladding layers 30.

The method for laminating the cladding layers 30 on both surfaces of the core layer 20 is not particularly limited, and there is a method where the core layer 20 and the cladding layers 30 are integrally formed using multi-layer melt extrusion, a method where a resin composition which forms the cladding layers 30 is coating processed and manufactured on both sides of a resin sheet or a resin film which becomes the core layer 20, and the like. The method of coating processing is not particularly limited, and a known method is possible such as a die coating method, a gravure coating method, a spin coating method, a dip coating method, a bar coating method, and a spray coating method.

A laminated body, where the cladding layers 30 are provided on both surfaces of the core layer 20 in the manner described above, is obtained and the obtained laminated body is cut into dimensions according to its purpose. After that, the light reflecting layer 40 is formed by providing a coating layer or a metallic layer which reflects visible light on one front surface of the laminated body, that is, on the front surface of one of the cladding layers 30, and the light guide 10 for a light source device is manufactured.

Next, the recess is provided in the light emitting face 14 of the cladding layer 30. The method for providing the recess is not particularly limited, and for example, there is laser processing, sandpaper processing, hot pressing, and the like.

As described above, in the light guide 10 for a light source device, the cladding layers 30 with refractive indexes lower than the core layer 20 are provided on both surfaces of the core layer 20. As a result, it is possible for the light incident from the light incidence face 12 to be propagated until far within the core layer 20 without the leakage of light due to the total reflection which occurs at the interface between the core layer 20 and the cladding layer 30 which have different refractive indexes. Furthermore, when the light guide for a light source device is a single layer of resin, there are cases where a portion where dust or dirt is adhered has a refractive index which is the same or greater than the refractive index of the single layer of resin and it is easy for the light which is propagated in the single layer of resin to leak, but since the total reflection occurs at the interface of the core layer 20 and the cladding layer 30, in the light guide 10 for a light source device, there is no leaking of the light which is propagated in the core layer 20 even if dust or the like adheres to the front surface of the cladding layer 30.

In addition, due to there being the light reflecting layer 40 on the opposite side to the light emitting face 14, it is possible for the light heading toward the opposite side to the light emitting face 14 at the recess to be scattered and reflected at the light emitting face 14 side. Since it is possible to lose the directionality of the emitted light and for the light incident from the light incidence face 12 to be emitted in the normal direction as well as it being possible to return the light, which was not able to be emitted, to the core layer 20 due to the scattering and reflecting, a reduction in the loss of the amount of light and an improvement in the luminance of the emitted light from the light emitting face 14 can be achieved.

Additionally, in the light guide 10 for a light source device, since the light guide and the reflective sheet are integrated, it is possible to reduce the number of parts required in assembly of the light source device, and to that extent, achieve simplification of the assembly operation of the light source device and reduce manufacturing costs.

Second Embodiment

Figure 2:
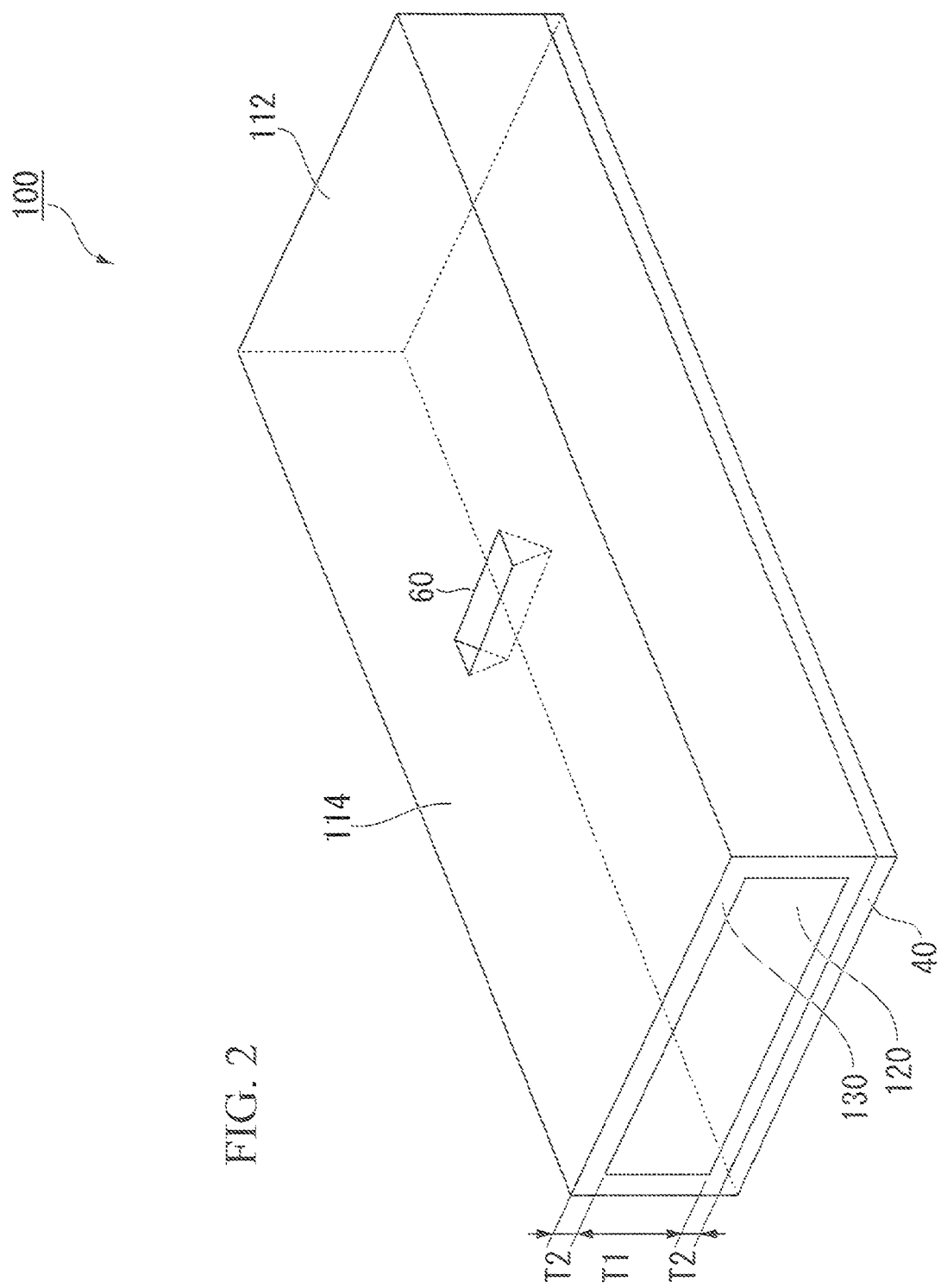
FIG. 2 is a perspective diagram illustrating a light guide for a light source device according to a second embodiment of the invention.

A light guide for a light source device according to a second embodiment of the invention will be described using FIG. 2. FIG. 2 is a perspective diagram of a light guide 100 for a light source device according to the second embodiment. As shown in FIG. 2, the light guide 100 for a light source device has a core layer 120, cladding layers 130 which are provided so as to cover both surfaces of an upper surface and a lower surface which are the main surfaces of the core layer 120 and two side surfaces which face toward the opposite surface from a light emitting face 114, and the light reflection layer 40 which is provided on the front surface of the cladding layer 130 on the opposite side to the light emitting face 114, and the light guide 100 for a light source device is the same as the first embodiment other than that one of the side surfaces where the cladding layer 130 is not provided is set as a light incidence face 112.

The material of the core layer 120 is the same as that of the core layer 20 and a thickness t1 of the core layer 120 is the same as the thickness T1 of the core layer 20. The material of the cladding layer 130 is the same as that of the cladding layer 30 and a thickness t2 of the cladding layer 130 is the same as the thickness T2 of the cladding layer 30. A refractive index difference of a refractive index of the core layer 120 and a refractive index of the cladding layer 130 is the same as the refractive index difference of the refractive index of the core layer 20 and the refractive index of the cladding layer 30.

A volume ratio of a volume V1 of the core layer 120 and a volume V2 of the cladding layer 130 is able to be determined in consideration of the material of the core layer 120 and the cladding layer 130.

Manufacturing Method

It is possible to manufacture the light guide 100 for a light source device as, for example, a substrate which is formed integrally using melt extrusion molding and where both main surfaces and two side surfaces of the core layer 120 are covered by the cladding layers 130 with the light reflecting layer 40 provided on one surface of the substrate. In a case where the substrate is integrally formed using multi-layer melt extrusion, it is possible to form the substrate where both main surfaces and two side surfaces of the core layer 120 are covered by the cladding layers 130 by extruded with the discharge width of the material of the core layer 120 being made narrower than that of the material of the cladding layer 130 which are extruded from a discharge port with a slit shape. Then, it is possible to obtain the light guide 100 for a light source device by forming the light reflecting layer 40, where a coating layer or a metallic layer which reflects visible light is provided on one of the front surfaces of the obtained substrate, that is, the front surface of one of the cladding layers 130, and providing the recess in the light emitting face 114.

Due to the configuration such as this, the light guide 100 for a light source device is able to prevent the leakage of light from the side surfaces and emitted light with higher luminance is possible since both main surfaces and two side surfaces of the core layer 120 are covered by the cladding layers 130.

As described above, the light guide for a light source device of the invention can be appropriately used in a liquid crystal display device used in a mobile phone, a laptop computer, a liquid crystal television, a video camera, or the like, and a thin light source device such as a backlit numerical keys of a mobile phone, a backlit keyboard of a computer, a display switch of an electrical appliance, or the like.

Here, in the first and second embodiments, the light reflecting layer is provided over the entire front surface of one of the cladding layers. However, in a case where there is a recess on the light emitting face, the light reflecting layer may be provided on the opposite side to the light emitting face at least at a position which reflects the light which is reflected at the recess.

Third Embodiment

Figure 7:
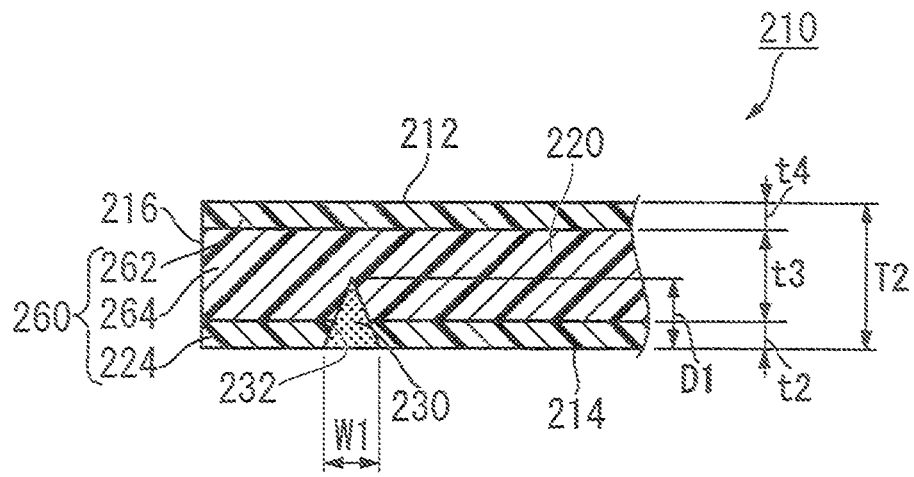
FIG. 7 is a cross-sectional diagram illustrating a light guide according to a third embodiment of the invention.

An example of a third embodiment of the invention will be described using FIG. 7. FIG. 7 is a partial cross-sectional diagram of a light guide 210 according to a third embodiment of the invention. As in FIG. 7, the light guide 210 is provided with a rear-surface-side light scattering section 230 which is formed on a rear surface of the opposite side to a light emitting face of the light guide 210 for a light source device with a plate shape, which has a core layer 264 and cladding layers (224, 262) which are provided on both surfaces of an upper surface and a lower surface which are the main surfaces of the core layer 264, by a second light reflecting layer being provided in an inner portion of a recess which passes through the rear-surface-side cladding layer 224 and reaches the core layer 264. Here, the portions where there is no particular description are the same as those of the first embodiment.

Light Guide for Light Source Device

In the light guide 220 for a light source device, the front surface of one of the cladding layers is set as a light emitting face 212 which emits incident light and a light incidence face 216 where light from a light source is incident is formed on one side surface. In the light guide 220 for a light source device, the rear-surface-side light scattering section 230 is provided which is formed by providing the second light reflecting layer in an inner portion of the recess with a shape which is from the front surface 214 of the cladding layer on the opposite side to the surface, where the light emitting face 212 is formed, toward the light emitting face 212.

The material, thickness, ratio, refractive index, and refractive index difference of the core layer and the cladding layer which form the light guide 220 for a light source device are the same as that for the light guide 10 for a light source device described above.

Rear-Surface-Side Light Scattering Section

The rear-surface-side light scattering section 230 is where a boundary surface 232 which at least comes into contact with the light guide 220 for a light source device is formed by the second light reflecting layer which scatters and reflects light. Accordingly, the rear-surface-side light scattering section 230 may be entirely formed on the second light reflecting layer or the second light reflecting layer may be formed along the boundary surface 232.

The material which forms the second light reflecting layer is not particularly limited if it has a function of scattering and reflecting light and it is possible to use the same material as the light reflecting layer described above.

The number of the rear-surface-side light scattering sections 230 is able to be determined according to the desired function of the light guide 210.

The shape of the rear-surface-side light scattering section 230 is not particularly limited if the inclination angle θ of the light incidence face side of the recess where the second light reflecting layer is provided satisfies equation (1) described above and is able to be determined in consideration of the position and range where the light is emitted.

In addition, in the same manner to the case of the light emitting means of the first embodiment, the shape and the deepest portion of the rear-surface-side light scattering section 230 and/or the distance with another adjacent rear-surface-side light scattering section 230 in a case where two or more rear-surface-side light scattering sections 230 are provided may be appropriately changed.

Manufacturing Method

It is possible to manufacture the light guide 210 using, for example, the following manufacturing method.

First, the light guide 220 for a light source device is manufactured using the method described above. Next, the recess is provided in the rear surface 214 of the light guide 220 for a light source device using the method described above (formation process). Next, by the rear-surface-side light scattering sections 230 being provided by the second light reflecting layer being coated in the recess (coating process), it is possible to obtain the light guide 210.

The shape of the recess in the formation process is not particularly limited if the inclination angle θ of the light incidence face side of the recess satisfies equation (1) described above and may be a shape according to the desired shape of the rear-surface-side light scattering sections 230. That is, the recess may be a space where there is the distance D1 until the deepest portion with regard to the rear surface 214 and which is partitioned by the boundary surface 232.

The coating process is a process where the second light reflecting layer is coated on at least the boundary surface 232 of the recess which is provided in the formation process and the rear-surface-side light scattering sections 230 which has a scattering and reflecting function is formed. The method of coating in the coating process is not particularly limited and it is possible to use a known printing or coating method such as screen printing, spray coating, coating, and ink jet printing. In addition, in order to improve the adhesion properties of the light scattering material to the light guide 20 for a light source device, modification of the light guide 220 for a light source device may be carried out as required using a corona discharge process, a plasma discharge process, or the like.

The shape of the second light reflecting layer with regard to the recess is able to be determined according to the desired light scattering function of the rear-surface-side light scattering sections 230, and for example, the second light reflecting layer may be provided on the boundary surface 232 or the second light reflecting layer may be formed by filling the entire recess with the light reflecting material.

In the light guide 210 of the invention, the light guide for a light source device is configured by the core layer 264 and the cladding layers (224, 262) which are provided on both surfaces of the upper surface and the lower surface which are the main surfaces of the core layer 264 and the rear-surface-side light scattering section 230 is provided which passes through the rear-surface-side cladding layer 224 on the rear surface 214 side in the light guide 220 for a light source device. As a result, since the light which is incident from the incidence surface 216 is totally reflected at the interface of the core layer 264 and the cladding layer 224 while being propagated in the core layer 264, it is possible to prevent the leakage of light other than in a position where light is emitted at the light emitting face 212. In addition, the light propagated in the core layer is scattered and reflected at the boundary surface 232 when reaching the rear-surface-side light scattering section 230 or is scattered in the rear-surface-side light scattering section 230, and there is a state of the light being scattered in the vicinity of the rear-surface-side light scattering section 230. Then, since the light is emitted from the light emitting face in a state of being scattered, it is possible to easily and stably attain emitted light with high luminance which is centered in a perpendicular (normal) direction of the light emitting face 212. Additionally, as in the past, it is not necessary to finely control the shape of the recess and it is possible to stably control the emission direction of the emitted light using a cheap and simple method where the second light reflecting layer is coated in the recess which is provided in the light guide for a light source device. As a result, it is possible to manufacture the light guide, which achieves an improvement in luminance centered in the normal direction, with high productivity.

Fourth Embodiment

Figure 8:
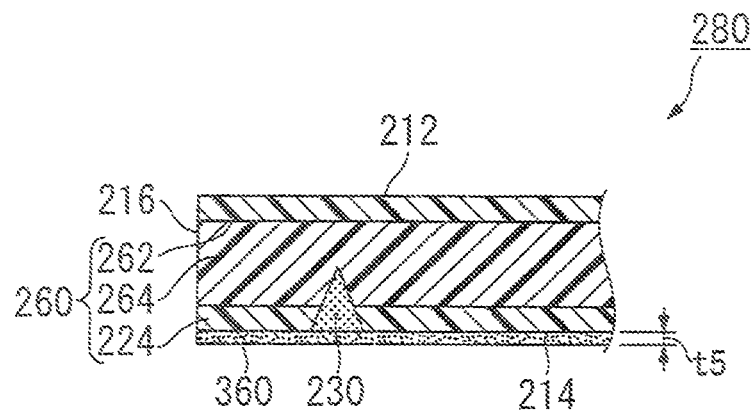
FIG. 8 is a cross-sectional diagram illustrating a light guide according to a sixth embodiment of the invention.

A light guide according to a fourth embodiment of the invention will be described using FIG. 8. As in FIG. 8, in a light guide 280, a light scattering layer 360 is provided on the rear surface 214 of a light guide 260 for a light source device where the rear-surface-side light scattering section 230 is provided. Here, the light scattering material which forms the light scattering layer 360 is the same as the light scattering material which forms the rear-surface-side light scattering section 230. The light scattering material which forms the light scattering layer 360 may be the same as or may be different from the light scattering material which forms the rear-surface-side light scattering section 230.

A thickness t5 of the light scattering layer 360 is able to be determined in consideration of the type of light scattering material which forms the light scattering layer 360.

In the light guide 280, the light scattering layer 360 is provided on a rear surface of the light guide 260 for a light source device. As a result, it is possible to prevent the leakage of light from the light emitting face 212 and the light which is incident from the light incidence face 216 is effectively utilized as the leakage of light from the rear surface 214 is minimized In the fourth embodiment, the light scattering layer is provided over the entire surface of the rear surface, but the invention is not limited to this, and the light scattering layer may be provided partially at an arbitrary location on the rear surface. In the case where the light scattering layer is provided partially on the rear surface, it is preferable if the light scattering layer is provided at least on the rear surface of the light emission position of the light emitting surface. By providing the required size of the light scattering layer only at the required position in this manner, it is possible to prevent the leakage of light, which is scattered by the light scattering section on the light emitting face side or the light scattering section on the rear surface side, from the rear surface and to achieve a reduction in manufacturing costs since it is possible to minimize the area of the light scattering layer.

Here, the invention is not limited to the embodiments described above and various modifications may be added within the range which does not depart from the invention. For example, in the first to the fourth embodiments, one of the side surfaces of the light guide for a light source device is set as the light incidence face but two or more of the side surfaces may be set as the light incidence faces.

EXAMPLES

Below, the invention will be described in detail using examples but is not limited thereto.

Example 1

Figure 9:
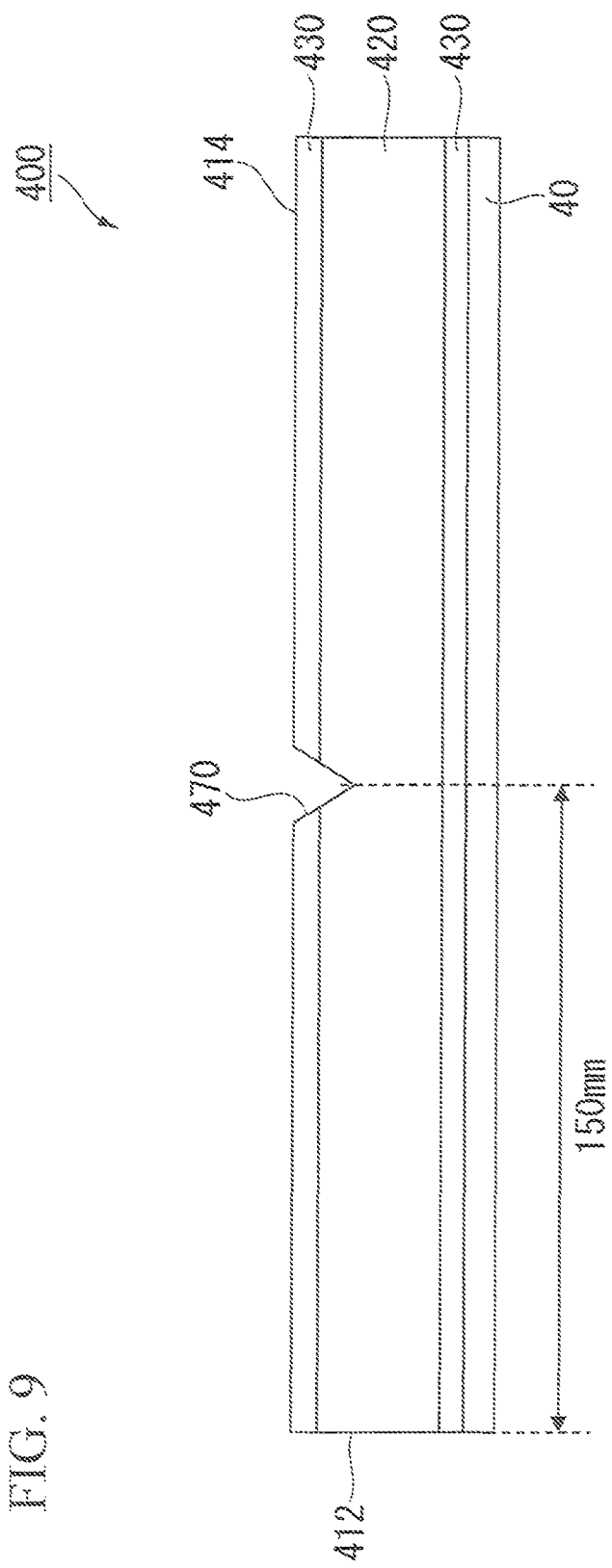
FIG. 9 is a perspective diagram illustrating a light guide for a light source device which uses optical characterization.

FIG. 9 is a schematic diagram of a sample which is manufactured according to this Example.

In the core layer, an acrylic resin (ACRYPET VH000, refractive index $n_1$=1.49, Mitsubishi Rayon Co., Ltd.) was used, and in the cladding layer, a vinylidene fluoride copolymer (KYNAR 720, refractive index $n_2$=1.42, Arkema K. K.) was used. A laminated body with a three-layered structure of cladding layer/core layer/cladding layer was formed with a width of 980 mm and a thickness of 300 µm using a co-extrusion sheet manufacturing device which has a T-die with a width of 1200 mm. When the thickness of the cladding layer of the formed laminate body was measured, the upper surface side and the lower surface side were both 5 µm. The overall thickness of the laminated body was 300 µm. After a light reflecting layer was provided on a partial surface of the laminate body, a rectangle with a width of 110 mm and length of 300 mm was cut out and a light guide 700 for a light source device was manufactured. The light reflecting layer was formed by uniformly coating a screen printing ink (#2500 120 white, Seiko Advance Ltd.) with a white color using a screen printing machine. Laser etching was carried out using a $CO_2$ laser marker ML-Z9520T manufactured by Keyence Corporation in a position which was 150 mm from an entering light edge surface of the light emitting face 714 of the light guide 700 and a recess 770 was provided. The pattern of the laser etching was a linear pattern which was parallel to the light incidence face 712 of the light guide 700 and one pattern with a length of 5 mm was provided. When the shape of the obtained recess 770 was evaluated using a confocal microscope (laser confocal microscope OLS-3000 manufactured by Olympus Corporation), a recess with a groove shape was formed which has a width of 282 µm, a depth of 132 µm, and an inclination angle on the light emitting face side of 43°.

Optical Characterization

Figure 10:
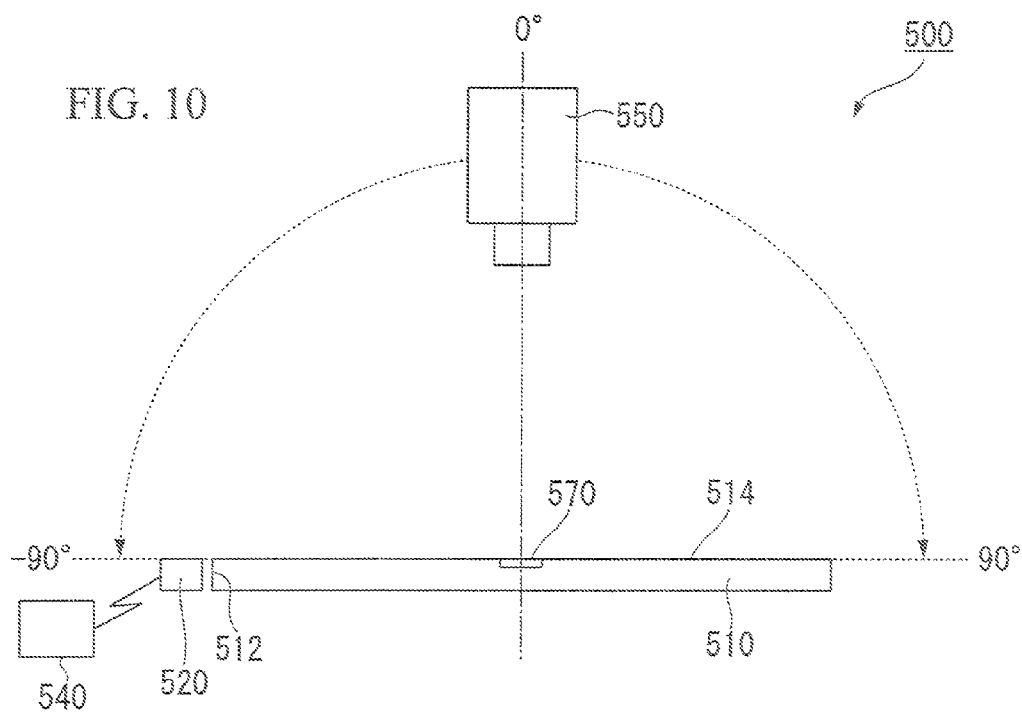
FIG. 10 is a pattern diagram illustrating a luminance measurement system which uses optical characterization.

FIG. 10 is a pattern diagram illustrating a measurement system which uses optical characterization. The optical characterization of the light source device was evaluated using the following method. A light source 820 (five LEDs NSSW020BT manufactured by Nichia Corporation) which emits light at 20 mA using a constant-current power source 840 was positioned in a light incidence face 812 of the light guide which was to be measured, and the luminance of light in the normal direction (0° direction) which was emitted from the emitting face of an area with a 2° viewing angle which was centered on a region where the light emitting means was provided and the luminance distribution of the emitted light angles from −90° to 90° of a surface which was parallel to the guiding light direction and perpendicular to the light guide face were measured using a luminance colorimeter 850 (Luminance colorimeter BM-7 manufactured by Topcon Corporation).

Comparative Example 1

Measurement was performed using the same method as Example 1 using a light guide for a light source device with a configuration which was the same as Example 1 other than a reflective sheet was used without the light reflecting layer being provided on the front surface of the light guide. Here, as the reflective sheet, Lumirror E20 manufactured by Toray Industries, Inc. was used.

Figure 11:
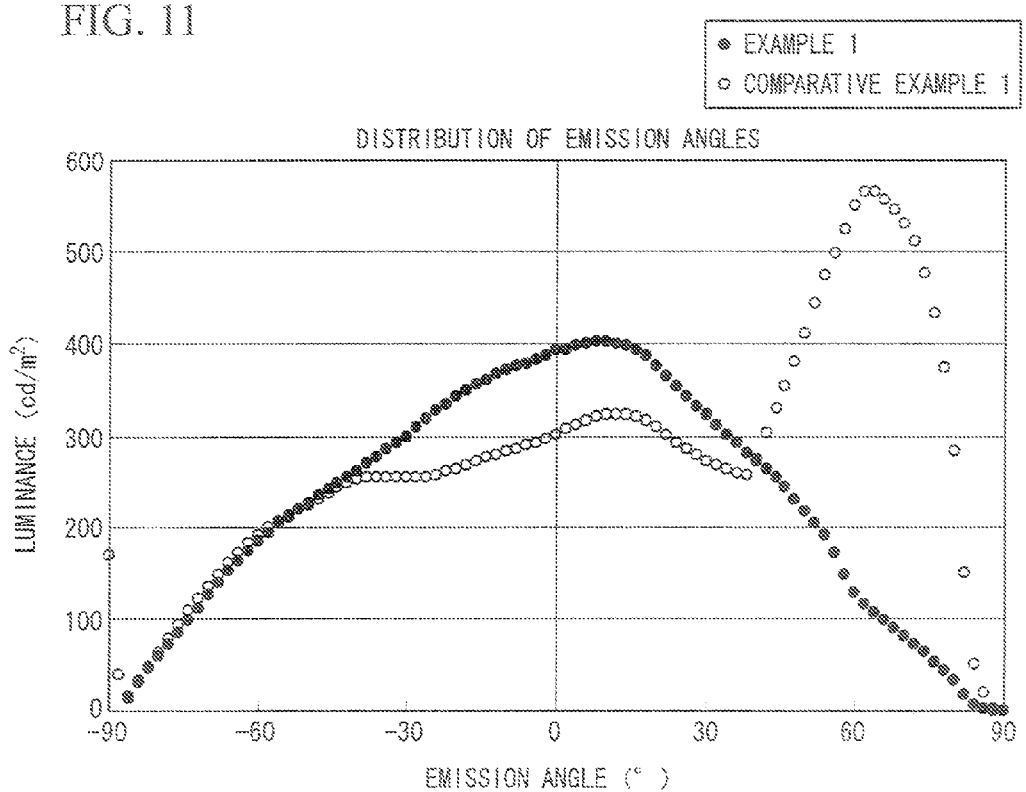
FIG. 11 is a luminance distribution diagram of emitted light angles.

The luminance measurement results in the normal direction for each of the light guides is shown in Table 1 and the luminance distribution results of the emitted light angles is shown in FIG. 11.

TABLE 1

|  | Light Guide | Light Reflecting Layer | Normal Luminance (cd/m$^2$) |
| --- | --- | --- | --- |
| Example 1 | Three layer | Yes | 392.4 |
| Comparative Example 1 | Three layer | No | 301.3 |

FIG. 11 is a graph illustrating the luminance distribution of a first light emitting mechanism, the horizontal axis shows the angle of the emitted light, the vertical axis shows the luminance at that angle, and the direction of the light incidence face 812 when viewed from the light emitting mechanism is shown as − (minus) and the opposite direction is shown as + (plus). It is understood that, while the peak of the emitted light deviated from the normal direction by a direction of 64° in the comparative example 1 with the luminance in the normal direction as 301.3 cd/m$^2$, the peak of the emitted light in Example 1 was substantially the same as the normal direction, and with the luminance in the normal direction as 392.4 cd/m$^2$, was an improvement on the comparative example 1 by approximately 1.3 times. This is a result where, when the light reflected at the recess provided as the emitting mechanism reaches the light reflecting layer, in addition to the light being reflected with no loss since the light reflecting layer was provided on the front surface of the light guide, the directionality of the emitted light was weakened due to the scattering by the white ink used as the light reflecting layer.

From the result above, due to the light guide described above being used in the invention, when the light guide is built into the light source device, emitted light with high luminance is possible at a particular position as well as it being possible to provide a light guide for a light source device where the ease of the assembly operation where the function of the reflective sheet is integrated is excellent.

Example 2

Figure 12:
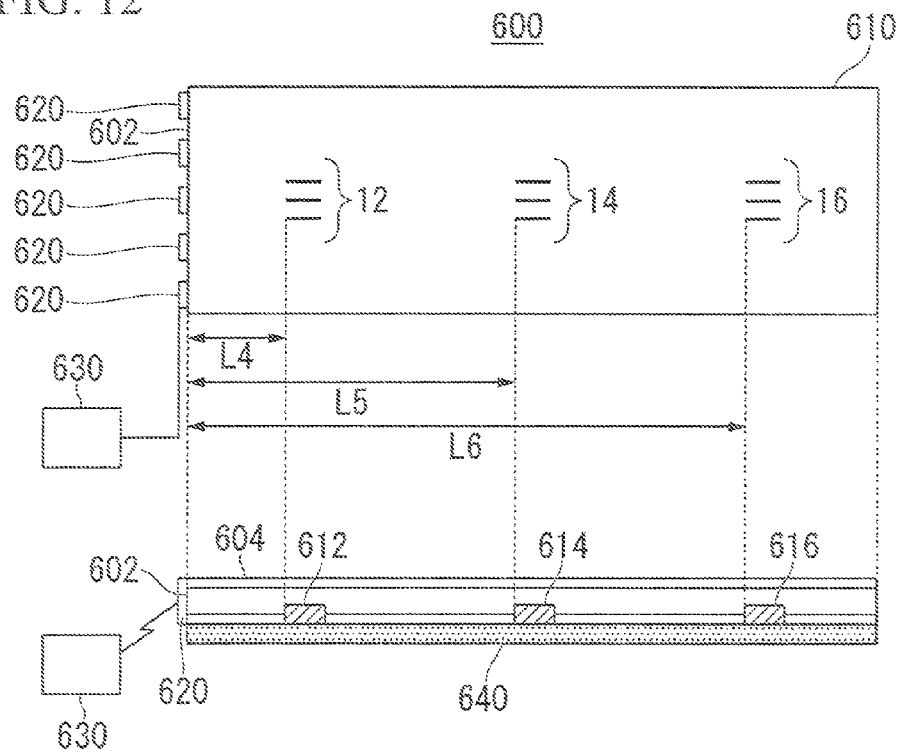
FIG. 12 is a pattern diagram describing a light guide of Example 2.

FIG. 12 is a pattern diagram of a light guide for a light source device which is manufactured according to this Example. As shown in FIG. 12, in a light guide 600, a first light emitting mechanism 612, a second light emitting mechanism 614, and a third light emitting mechanism 616 were formed as a group of three parallel line shapes in a rear surface 606 on the opposite side to a light emitting face of a light guide 610 for a light source device.

Manufacturing of Light Guide

A laminated body with a three-layered structure of cladding layer/core layer/cladding layer was formed using the same method as Example 1. A rectangle with a width of 110 mm and length of 300 mm was cut out of the laminate body and a light guide 610 for a light source device was manufactured.

A recess was provided where laser etching in a line shape was carried out on the rear surface 606 of the opposite side to the light emitting face of the light guide 610 for a light source device using the $CO_2$ laser marker described above so that the distances from the light incidence surface 602 to the edges of the first light emitting mechanism 612, the second light emitting mechanism 614, and the third light emitting mechanism 616 respectively were L4: 50 mm, L5: 150 mm, and L6: 250 mm. In the pattern of the laser etching, three parallel line shapes with lengths of 5 mm were provided in parallel with intervals of 2.5 mm in a longitudinal direction (light guiding direction of the incident light) of the light guide 610 for a light source device. The result of the obtained etching groove shapes being evaluated by a laser confocal microscope OLS-3000 (Olympus Corporation) is shown in Table 2. As shown in Table 2, in regard to all of the etching grooves, the inclination angle of the light incidence face side satisfies equation (1) and the deepest portion thereof becomes deeper with regard to the rear surface 606 in accordance with being separated from the light incidence face 602.

TABLE 2

| | First Light Emitting Mechanism | Second Light Emitting Mechanism | Third Light Emitting Mechanism |
|---|---|---|---|
| Distance from Light Incidence Face (mm) | L4 = 50 | L5 = 150 | L6 = 250 |
| Width (μm) | 301 | 450 | 513 |
| Depth (μm) | 56 | 115 | 174 |
| Inclination Angle of Light Emitting Face Side (°) | 21 | 33 | 28 |

Next, the screen printing ink (#2500 120 white, Seiko Advance Ltd.) was uniformly applied as the light scattering material using a screen printing machine to the entire surface of the rear surface of the light guide 910 for a light source device where the etching grooves were provided, the etching grooves were filled with the light scattering material, a light reflecting layer 640 with a thickness of 10 μm was formed, and the light guide 600 was formed. In this manner, the light guide 600 was obtained where the first light emitting mechanism 612, the second light emitting mechanism 614, and the third light emitting mechanism 616 which are rear-surface-side light scattering sections were provided in the light guide 610 for a light source device.

Measurement of Normal Luminance and Luminance Distribution

Figure 13:
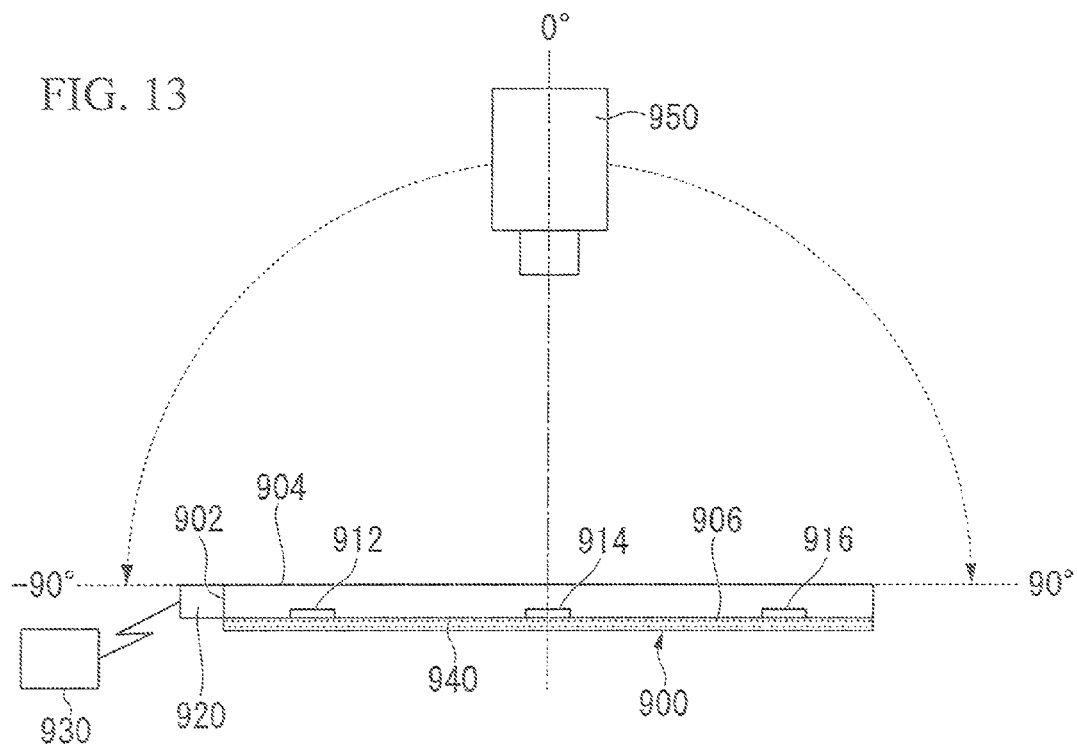
FIG. 13 is a pattern diagram describing a measurement system of normal luminance and luminance distribution of Example 2.
Figure 14:
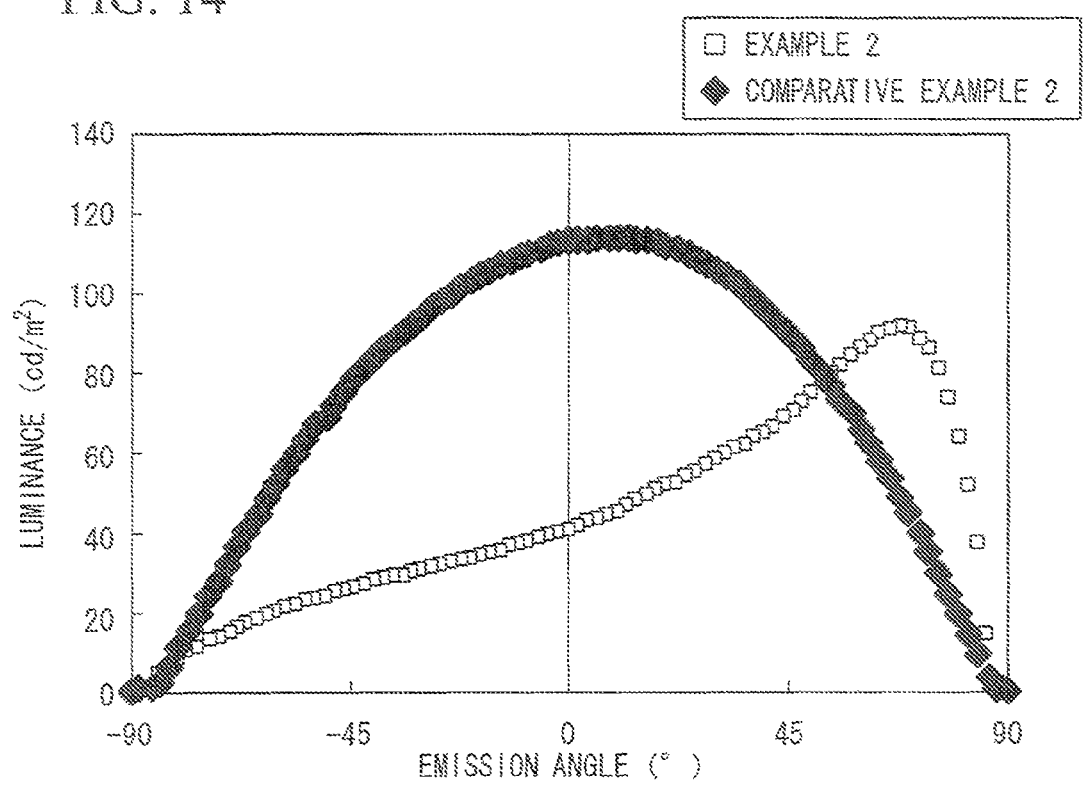
FIG. 14 is a graph illustrating a result of the luminance distribution of Example 2.

The measurement method of the luminance distribution will be described using FIGS. 12 and 13. As in FIGS. 12 and 13, five light sources 620 (LED NSSW020BT, Nichia Corporation) which were driven at 20 mA using a constant-current power source 630 were arranged in the light incidence face 602. A luminance colorimeter 650 (luminance colorimeter BM-7A, Topcon Technohouse Corporation) was arranged in the normal direction of the light emitting face 604 centered on the first light emitting mechanism 612 of the light guide 600. Next, the light which was emitted from the light source 620 was incident on the light guide 600 from the light incidence face 602. Then, the luminance (normal luminance) in the normal direction (0° direction) of the light, which was emitted from the light emitting face 604 of an area with a 2° viewing angle which was centered on the first light emitting mechanism 612 which was a position closest from the light source 620, and the luminance distribution of the emitted light angles from −90° to 90° of a surface which was parallel to the guiding light direction and perpendicular to the light guide 600 were measured. The normal luminance was measured also in regard to the second light emitting mechanism 614 and the third light emitting mechanism 616 in the same manner as the first light emitting mechanism 612. The measurement result of the obtained normal luminance is shown in Table 3 and the measurement result of the luminance distribution is shown in FIG. 14.

Comparative Example 2

Other than the light scattering material not being coated on the rear surface 606 of the light guide 610 for a light source device, a light guide was manufactured in the same manner as Example 2. That is, the first light emitting mechanism 612, the second light emitting mechanism 614, and the third light emitting mechanism 616 are etching grooves where the light scattering material was not coated. In regard to the obtained light guide, the normal luminance and the luminance distribution were measured in the same manner as Example 2. The measurement result of the obtained normal luminance is shown in Table 3 and the measurement result of the luminance distribution is shown in FIG. 14. Here, the shape of the etching groove of the light guide used in the comparative example was the same as the light guide 600 in Example 2 (refer to Table 2). In addition, in the measuring of the normal luminance and the luminance distribution, the reflective sheet (Lumirror E20, Toray Industries, Inc.) was arranged on the rear surface of the light guide.

TABLE 3

| | First Light Emitting Mechanism | Second Light Emitting Mechanism | Third Light Emitting Mechanism |
|---|---|---|---|
| Example 2 Normal Luminance (cd/m²) | 113.2 | 132.3 | 96.2 |
| Comparative Example 2 Normal Luminance (cd/m²) | 40.5 | 32.1 | 41.6 |

As in the results of Table 3, the normal luminance in Example 2 was 96.2 cd/m² to 132.3 cd/m² even at any position on the light emitting face. On the other hand, the normal luminance in the comparative example 2 was 32.1 cd/m² to 41.6 cd/m². From this, it is understood that an improvement in normal luminance can be achieved by providing the light emitting mechanisms which were filled with the light scattering material.

FIG. 14 is a graph illustrating the luminance distribution in the first light emitting mechanism, the horizontal axis shows the angle of the emitted light, the vertical axis shows the luminance at that angle, and the direction of the light incidence face 812 when viewed from the light emitting mechanism is shown as − (minus) and the opposite direction is shown as + (plus). As shown in FIG. 14, since, while the peak of the emitted light substantially matches the normal direction in Example 2, the peak of the emitted light was deviated from the normal direction by a direction of 68° in the comparative example 2, and the luminance in the normal direction in the comparative example 2 was lower. From this, it is understood that there is a significant improvement in the normal luminance in Example 2.

INDUSTRIAL APPLICABILITY

In the light guide of the invention, since it is possible for the light guide and the reflective sheet to be integrated without the light guiding properties being reduced, it is possible to achieve an improvement in the luminance of the light source device and simplification of the assembly operation of the light source device. In addition, it is possible for the light guide of the invention to be applied to productively and cheaply controlling the emission direction of the emitted light and the improvement of the luminance of the light emitting face using a simple method.

Figure 5:
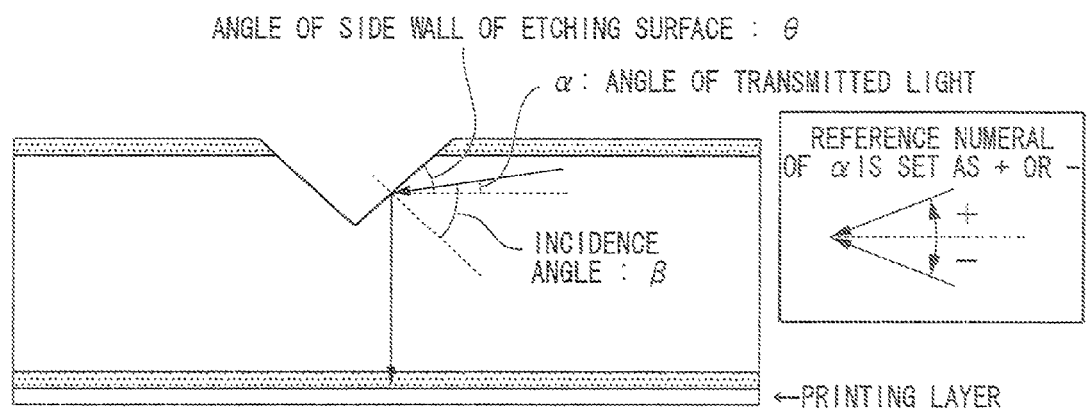
FIG. 5 is a diagram describing a relationship of a propagation state of light in a light guide for a light source device with an inclination angle of a light incidence face side.

REFERENCE SIGNS LIST 10, 100, 210, 220, 260 280, 400, 600 LIGHT GUIDE FOR A LIGHT SOURCE DEVICE
12, 112, 216, 602 LIGHT INCIDENCE FACE
14, 114, 212, 604 LIGHT EMITTING FACE
20, 120, 264 CORE LAYER
30, 130, 224, 262 CLADDING LAYER
40 LIGHT REFLECTING LAYER
70 RECESS
230 LIGHT SCATTERING SECTION
232 INTERFACE SURFACE
460, 640 LIGHT SCATTERING LAYER
470 LIGHT EMITTING MEANS
612, 614, 616 LIGHT EMITTING MECHANISM
FIG. 5
ANGLE OF SIDE WALL OF ETCHING SURFACE: θ
α: ANGLE OF TRANSMITTED LIGHT
INCIDENCE ANGLE: β
PRINTING LAYER
REFERENCE NUMERAL OF α IS SET AS + OR −
FIG. 11
DISTRIBUTION OF EMISSION ANGLES
LUMINANCE
EMISSION ANGLE
EXAMPLE 1
COMPARATIVE EXAMPLE 1
FIG. 14
LUMINANCE
EMISSION ANGLE
EXAMPLE 2
COMPARATIVE EXAMPLE 2

The invention claimed is:

1. A light guide for a light source device comprising:
a core layer which is formed from a transparent resin and has a refractive index $n_1$; and
cladding layers which are provided on both surfaces thereof and have a refractive index $n_2$ which is lower than the refractive index $n_1$ of the core layer;
wherein a light reflecting layer which scatters and reflects light is provided in the front surface of one cladding layer, the front surface of the other cladding layer is set as a light emitting face, and a recess is provided which reaches from at least one of either of the front surface of the one cladding layer or the front surface of the other cladding layer to the core layer passing through the cladding layer,
wherein at least one of the side edge surfaces of the light guide for a light source device, which is substantially perpendicular to a surface where the light emitting face and the light reflecting layer are provided, is set as a light incidence face, and the recess is provided in the light emitting face and the inclination angle θ of the light incidence face side of the recess satisfies equation (1) below $$\theta \leq 90 + \cos^{-1}(n_2/n_1) - \sin^{-1}(1/n_1) \qquad \text{equation (1).}$$

2. The light guide for a light source device according to claim 1,
wherein the light reflecting layer is provided so as to cover the entire front surface of one of the cladding layers.

3. The light guide for a light source device according to claim 1,
wherein the light reflecting layer is provided in a position where light reflected by the recess is reflected.

4. The light guide for a light source device according to claim 1,
wherein the depth of the recess increases in accordance with separation from the light incidence face.

5. The light guide for a light source device according to claim 1,
wherein the distance between adjacent recesses decreases in accordance with separation from the light incidence face.

6. A light guide for a light source device comprising:
a core layer which is formed from a transparent resin and has a refractive index $n_1$; and
cladding layers which are provided on both surfaces thereof and have a refractive index $n_2$ which is lower than the refractive index $n_1$ of the core layer;
wherein a light reflecting layer which scatters and reflects light is provided in the front surface of one cladding layer, the front surface of the other cladding layer is set as a light emitting face, and a recess is provided which reaches from at least one of either of the front surface of the one cladding layer or the front surface of the other cladding layer to the core layer passing through the cladding layer,
wherein at least one of the side edge surfaces of the light guide for a light source device, which is substantially perpendicular to the surface where the light emitting face and the light reflecting layer are provided, is set as the light incidence face, a recess is provided in a surface where the light reflecting layer is provided, and a second light reflecting layer is provided in an inner portion of the recess.

7. The light guide for a light source device according to claim 6, wherein the inclination angle θ of the light incidence face side of the recess satisfies equation (2) below $$\theta \leq 90 + \cos^{-1}(n_2/n_1) - \sin^{-1}(1/n_1) \qquad \text{equation (2).}$$

8. The light guide for a light source device according to claim 6,
wherein the depth of the recess increases in accordance with separation from the light incidence face.

9. The light guide for a light source device according to claim 6,
wherein the distance between adjacent recesses decreases in accordance with separation from the light incidence face.

10. The light guide for a light source device according to claim 6,
wherein the light reflecting layer is provided so as to cover the entire front surface of one of the cladding layers.

11. The light guide for a light source device according to claim 10,
wherein the light reflecting layer is a coating layer with a white color.

\* \* \* \* \*